(12) United States Patent
Kim (10) Patent No.: US 9,678,201 B2
(45) Date of Patent: Jun. 13, 2017

(54) ULTRASONIC TRANSDUCER AND ULTRASONIC DIAGNOSTIC APPARATUS EMPLOYING THE SAME

(71) Applicant: SAMSUNG ELECTRONICS CO., LTD., Suwon-si (KR)

(72) Inventor: Dong-kyun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 287 days.

(21) Appl. No.: 14/453,096

(22) Filed: Aug. 6, 2014

(65) Prior Publication Data

US 2015/0109880 A1     Apr. 23, 2015

(30) Foreign Application Priority Data

Oct. 23, 2013  (KR) ......................... 10-2013-0126700

(51) Int. Cl.
   *B06B 1/02*    (2006.01)
   *G01S 7/52*    (2006.01)
   *G01S 15/89*   (2006.01)

(52) U.S. Cl.
   CPC ........ *G01S 7/52017* (2013.01); *B06B 1/0292* (2013.01); *G01S 7/52047* (2013.01); *G01S 15/8925* (2013.01)

(58) Field of Classification Search
   CPC .... B81B 3/0021; H04R 19/04; H04R 19/005; B06B 1/0292; G01S 7/52017; G01S 7/52047; G01S 15/8925
   See application file for complete search history.

(56) References Cited

U.S. PATENT DOCUMENTS

| 5,546,946 | A | 8/1996 | Souquet | |
|---|---|---|---|---|
| 6,262,946 | B1* | 7/2001 | Khuri-Yakub | G10K 11/002 367/153 |
| 2004/0174773 | A1* | 9/2004 | Thomenius | B06B 1/0292 367/174 |
| 2005/0121734 | A1* | 6/2005 | Degertekin | A61B 5/0215 257/414 |
| 2012/0069701 | A1* | 3/2012 | Machida | B06B 1/0292 367/7 |
| 2014/0010052 | A1* | 1/2014 | Torashima | B06B 1/0292 367/181 |
| 2014/0117812 | A1* | 5/2014 | Hajati | B06B 1/0276 310/314 |

FOREIGN PATENT DOCUMENTS

| JP | 4193615 B2 | 12/2008 |
|---|---|---|
| JP | 4294798 B2 | 7/2009 |
| JP | 5019997 B2 | 9/2012 |

* cited by examiner

*Primary Examiner* — Hovhannes Baghdasaryan
(74) *Attorney, Agent, or Firm* — Sughrue Mion, PLLC (57) ABSTRACT

An ultrasonic transducer includes a substrate; and a plurality of capacitive ultrasonic cells arranged on the substrate in a predetermined direction. Thicknesses of cavities in the plurality of capacitive ultrasonic cells are determined based on locations of the plurality of capacitive ultrasonic cells in the predetermined direction.

20 Claims, 13 Drawing Sheets

ULTRASONIC TRANSDUCER AND ULTRASONIC DIAGNOSTIC APPARATUS EMPLOYING THE SAME

CROSS-REFERENCE TO RELATED APPLICATION

This application claims priority from Korean Patent Application No. 10-2013-0126700, filed on Oct. 23, 2013, in the Korean Intellectual Property Office, the disclosure of which is incorporated herein in its entirety by reference.

BACKGROUND

1. Field

Apparatuses and methods consistent with exemplary embodiments relate to ultrasonic transducers and ultrasonic diagnostic apparatuses employing the ultrasonic transducers.

2. Description of the Related Art

An ultrasonic diagnostic apparatus irradiates an ultrasonic wave onto an internal part of an object such as a human being or an animal and detects an echo signal reflected from the internal part of the object, thereby displaying a cross-sectional image of an organ in the object and providing information for diagnosing a disease of the object.

A probe in the ultrasonic diagnostic apparatus includes an ultrasonic transducer for converting an electric signal into an ultrasonic signal, or vice versa. The ultrasonic transducer has a plurality of ultrasonic cells that are arranged two-dimensionally. A micromachined ultrasonic transducer (MUT) is adopted as the ultrasonic cell. The MUT may be classified as a piezoelectric MUT (pMUT), a capacitive MUT (cMUT), and a magnetic MUT (mMUT) according to a conversion type thereof.

SUMMARY

One or more exemplary embodiments provide ultrasonic transducers capable of increasing a spatial resolution of an ultrasonic diagnostic image, and ultrasonic diagnostic apparatuses employing the ultrasonic transducers.

One or more exemplary embodiments also provide ultrasonic transducers capable of reducing an effect of a side lobe, and ultrasonic diagnostic apparatuses employing the ultrasonic transducers.

According to an aspect of an exemplary embodiment, an ultrasonic transducer includes: a substrate; and a plurality of capacitive ultrasonic cells arranged on the substrate in a predetermined direction, wherein thicknesses of cavities in the plurality of capacitive ultrasonic cells are determined based on locations of the plurality of capacitive ultrasonic cells in the predetermined direction.

The plurality of capacitive ultrasonic cells may be arranged two dimensionally in a first direction and a second direction, and the thicknesses of the cavities in the plurality of capacitive ultrasonic cells may be determined based on locations of the plurality of capacitive ultrasonic cell in at least one from among the first direction and the second direction.

An upper surface of each of the plurality of capacitive ultrasonic cells may be a flat surface.

A thickness of a cavity in a capacitive ultrasonic cell may be greater at a center portion of the ultrasonic transducer than at an end portion thereof in at least one from among the first direction and the second direction.

A thickness of a cavity in a capacitive ultrasonic cell may be smaller at a center portion of the ultrasonic transducer than at an end portion thereof in at least one from among the first direction and the second direction.

Each of the plurality of capacitive ultrasonic cells may include a lower electrode provided on the substrate, an insulating layer provided on the lower electrode, a barrier wall provided on the insulating layer, a vibration layer provided on the barrier wall, and an upper electrode provided on the vibration layer, wherein the thicknesses of the upper electrodes in the plurality of capacitive ultrasonic cells are substantially the same.

The substrate may include a low resistive substrate which provides the lower electrode.

Thicknesses of the insulating layers in the plurality of capacitive ultrasonic cells may be substantially constant. A plurality of stepped portions corresponding to the thicknesses of the cavities in the plurality of capacitive ultrasonic cells may be provided on an upper surface of the substrate, and the plurality of capacitive ultrasonic cells may be provided respectively on the plurality of stepped portions.

Distances between the upper electrodes and the lower electrodes in the plurality of capacitive ultrasonic cells may be substantially constant. A thickness of the insulating layer in the each of the plurality of capacitive ultrasonic cells may vary depending on a location of a corresponding capacitive ultrasonic cell in the first direction.

According to an aspect of another exemplary embodiment, an ultrasonic transducer includes: a substrate; a plurality of elements arranged on the substrate in a first direction, each of the plurality of elements including a plurality of capacitive ultrasonic cells arranged in a second direction, each capacitive ultrasonic cell including a lower electrode and an upper electrode, wherein thicknesses of upper electrodes in the plurality of capacitive ultrasonic cells may be substantially the same, and distances between the upper electrodes and lower electrodes in the plurality of capacitive ultrasonic cells are determined based on locations of the plurality of capacitive ultrasonic cells in the first direction.

The substrate may provide the lower electrodes of the plurality of capacitive ultrasonic cells.

A plurality of stepped portions corresponding to the distances between the upper electrodes and the lower electrodes in the plurality of capacitive ultrasonic cells may be provided on an upper surface of the substrate and are arranged in the first direction.

Distances between an upper surface of the substrate and the upper electrodes may be substantially constant, and insulating layers having different thicknesses may be provided on the upper surface of the substrate to correspond to the distances between the upper electrodes and the lower electrodes in the plurality of capacitive ultrasonic cells.

A distance between an upper electrode and a lower electrode in a capacitive ultrasonic cell may be greater at a center portion of the ultrasonic transducer than an end portion thereof in the first direction.

A distance between an upper electrode and a lower electrode in a capacitive ultrasonic cell may be smaller at a center portion of the ultrasonic transducer than an end portion thereof in the first direction.

According to an aspect of still another exemplary embodiment, an ultrasonic diagnostic apparatus includes: an ultrasonic probe including the ultrasonic transducer described above, configured to transmit an ultrasonic wave to an object, and configured to receive an ultrasonic wave reflected from the object to generate an echo signal; and a signal processing device configured to generate an image of the object based on the echo signal.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Hereinafter, exemplary embodiments will now be described more fully with reference to the accompanying drawings. The exemplary embodiments may, however, be embodied in many different forms and should not be construed as being limited to the embodiments set forth herein; rather, these embodiments are provided so that this disclosure will be thorough and complete, and will fully convey the scope of the disclosure to those skilled in the art. For example, configuring elements that are singular forms may be executed in a distributed fashion, and also, configuring elements that are distributed may be combined and then executed. In the following description, well-known functions or constructions are not described in detail since they would obscure the disclosure with unnecessary detail. Also, throughout the specification, like reference numerals in the drawings denote like elements.

In the drawings, the thicknesses of layers and regions are exaggerated for clarity. Expressions such as "at least one of," when preceding a list of elements, modify the entire list of elements and do not modify the individual elements of the list.

Figure 1:
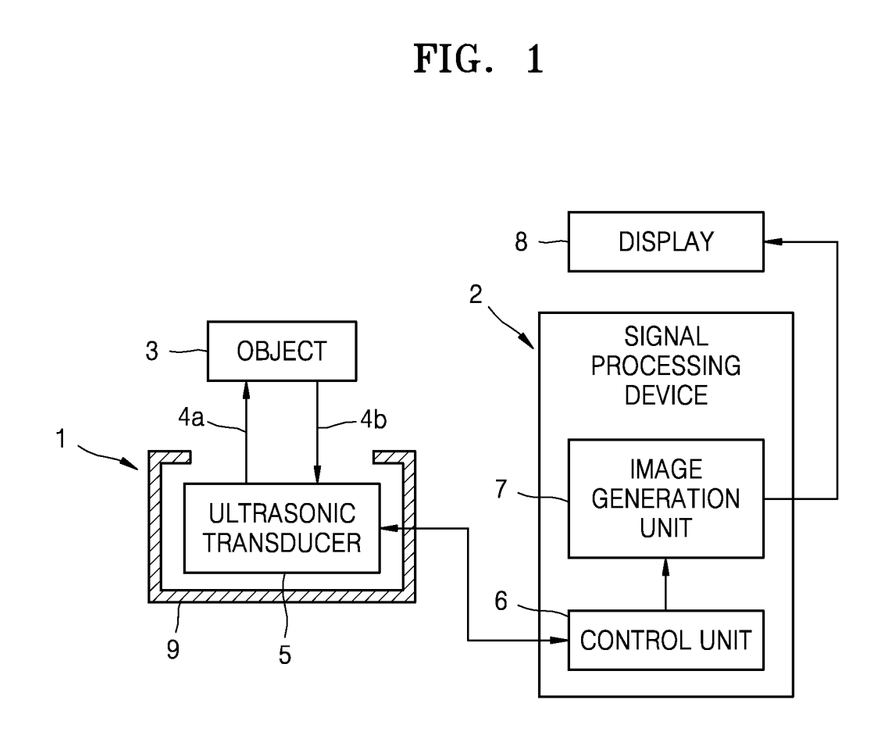
FIG. 1 is a schematic block diagram of an ultrasonic diagnostic apparatus according to an embodiment.

FIG. 1 is a schematic block diagram of an ultrasonic diagnostic apparatus. Referring to FIG. 1, an ultrasonic diagnostic apparatus includes an ultrasonic probe 1 and a signal processing device 2. The ultrasonic probe 1 includes an ultrasonic transducer 5 that transmits an ultrasonic wave 4a onto an object (for example, a human body) 3 and receives an ultrasonic wave 4b reflected from the object 3. The ultrasonic transducer 5 is accommodated in a housing 9.

The signal processing device 2 controls the ultrasonic probe 1 and generates an image of the object 3 based on an echo signal representing information about the object 3, which is detected by the ultrasonic probe 1. The signal processing device 2 may include a control unit 6 and an image generation unit 7. The control unit 6 may control the ultrasonic transducer 5 to transmit and/or receive the ultrasonic waves 4a and 4b. The control unit 6 determines a location where the ultrasonic wave is to be irradiated and an intensity of the irradiated ultrasonic wave, and controls the ultrasonic transducer 5 according to the determination. One of ordinary skill in the art would appreciate that the control unit 6 may additionally control general operations of the ultrasonic probe 1. The ultrasonic transducer 5 may receive an echo ultrasonic wave reflected from the object 3 to generate an echo signal to perform the diagnosis. The image generation unit 7 receives the echo signal, and generates ultrasonic images of the object 3 by using the echo signal. Processes of generating the ultrasonic images by using the echo signal are well known in the art, and thus, detailed descriptions thereof are omitted here. The ultrasonic images may be displayed on a display 8.

The signal processing device 2 may be realized by, for example, a processor including an array of a plurality of logic gates, may be realized as a combination of a universal microprocessor and a memory storing a program that may be executed by the microprocessor. In addition, one of ordinary skill in the art would appreciate that the signal processing device 2 may be realized as an appropriate type of hardware.

Figure 2:
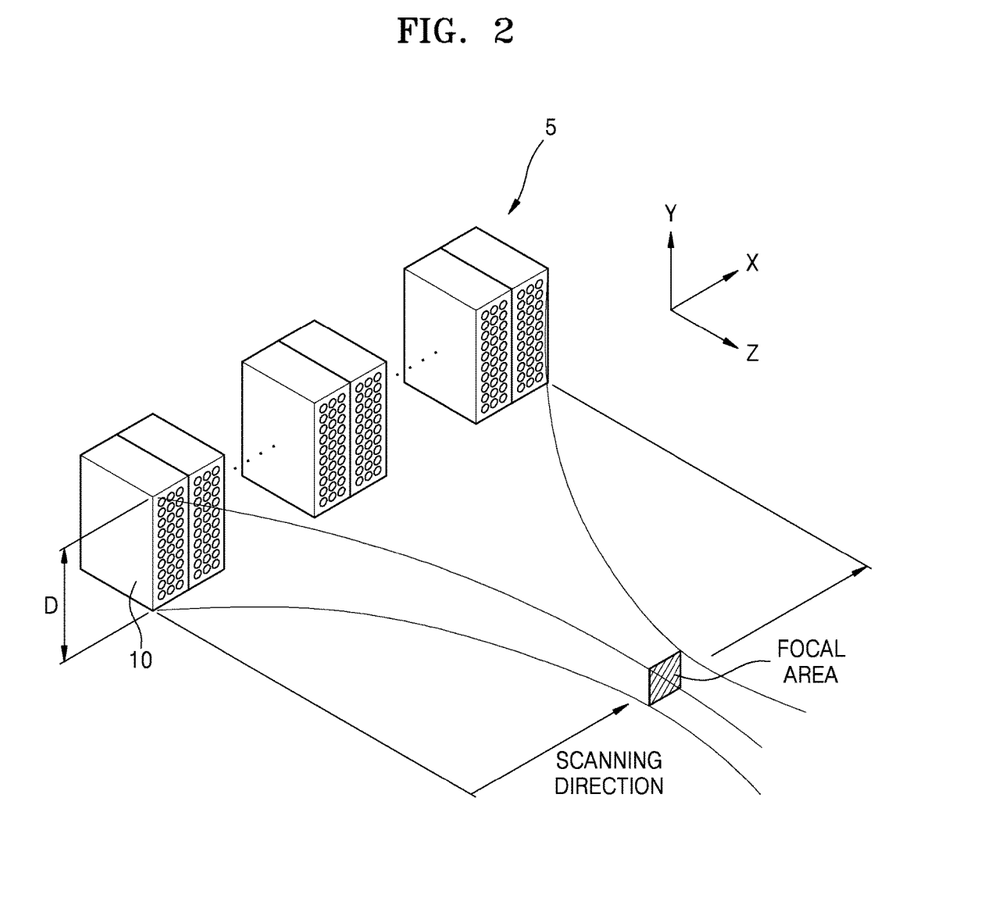
FIG. 2 is a schematic diagram of an ultrasonic transducer according to an embodiment.
Figure 3:
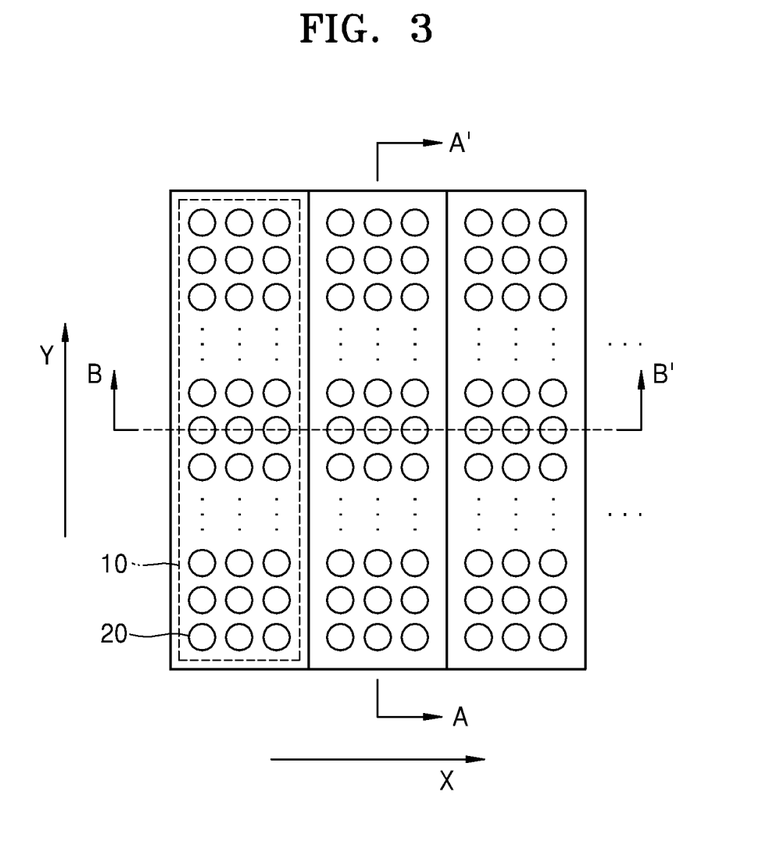
FIG. 3 is a plan view of an ultrasonic transducer according to an embodiment.

FIG. 2 is a schematic diagram of the ultrasonic transducer 5, and FIG. 3 is a plan view of the ultrasonic transducer 5. Referring to FIGS. 2 and 3, the ultrasonic transducer 5 includes a plurality of ultrasonic cells 20 that are arranged two-dimensionally in a lateral direction (X) and an elevation direction (Y). The plurality of ultrasonic cells 20 may be classified as a plurality of ultrasonic elements 10. The plurality of ultrasonic elements 10 may be arranged one-dimensionally in the lateral direction (X). Alternatively, the plurality of ultrasonic elements 10 may be arranged two-dimensionally in the lateral direction (X) and the elevation direction (Y) (see FIG. 13). The ultrasonic transducer 5 may be driven by using each of the ultrasonic elements 10 as a driving unit.

Each of the ultrasonic cells 20 acts as an ultrasonic transducer, and the ultrasonic cell 20 may be, for example, a piezoelectric micromachined ultrasonic transducer (pMUT), a capacitive micromachined ultrasonic transducer (cMUT), or a magnetic micromachined ultrasonic transducer (mMUT). In the present embodiment, it is assumed that the ultrasonic cell 20 is implemented as the cMUT. Since the pMUT uses a piezoelectric device, is the pMUT has a limitation in manufacturing a fine MUT. On the other hand, the cMUT has a size of about tens of micron. Since the cMUT may be formed by a series of semiconductor manufacturing processes, more ultrasonic cells 20 may be arranged two-dimensionally in a restricted area than those of the pMUT. Thus, diagnostic accuracy of higher level may be achieved, and a diagnostic image of higher resolution may be obtained.

Figure 4:
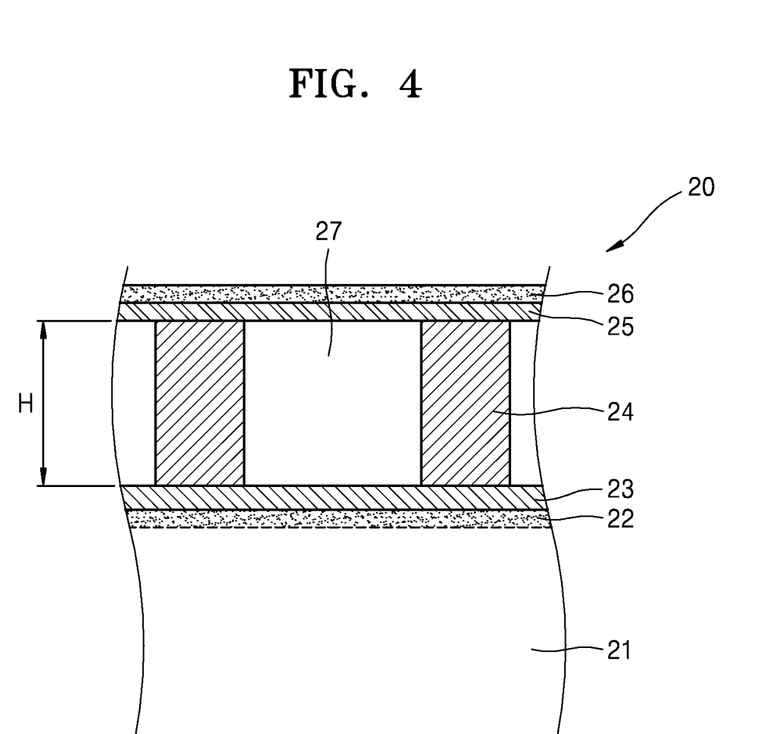
FIG. 4 is a cross-sectional view of a capacitive micromachined ultrasonic transducer (cMUT) as an example of an ultrasonic cell, according to an embodiment.

FIG. 4 is a cross-sectional view of a cMUT as an example of the ultrasonic cell 20. Referring to FIG. 4, a cMUT may be fabricated by forming a lower electrode 22, an insulating layer 23, and walls 24 for defining a cavity 27 on a substrate 21, and forming a vibration layer 25, on which an upper electrode 26 is formed, on the walls 24. Since the substrate 21 may act as the lower electrode 22 when the substrate 21 is a low resistive substrate, the lower electrode 22 shown in FIG. 4 may be omitted. The low resistive substrate may be, for example, a silicon substrate, or a substrate doped with a conductive material. According to the above configuration, the lower electrode 22, the vibration layer 25 on which the upper electrode 26 is formed, and the cavity 27 between the lower electrode 22 and the vibration layer 25 form a capacitor. When a direct current (DC) voltage is applied between the lower electrode 22 and the upper electrode 26, the vibration layer 25 is displaced by an electrostatic force (or Coulomb force), that is, the vibration layer 25 is pulled down toward the lower electrode 22. The vibration layer 25 is stopped at a location where drag caused by an internal stress of the vibration layer 25 and the electrostatic force are balanced. In this state, when an alternating current (AC) voltage that is less than the DC voltage is applied between the lower and upper electrodes 22 and 26, the vibration layer 25 vibrates to generate ultrasonic waves. On the other hand, in a state where the vibration layer 25 is displaced due to the application of the DC voltage, when a sound pressure of an ultrasonic wave is applied to the vibration layer 25 from outside, displacement of the vibration layer 25 is changed. Variation in the displacement of the vibration layer 25 causes variation in an electrostatic capacity. By detecting the variation in the electrostatic capacity, the ultrasonic wave may be received. That is, the ultrasonic wave may be generated and received by using the cMUT.

Although not shown in the drawings, the ultrasonic transducer 5 may further include a driving substrate that is disposed under the substrate 21 and includes a driving circuit for driving the ultrasonic cells 20 and a receiving circuit for receiving echo signals from the ultrasonic cells 20.

Referring back to FIG. 2, a spatial resolution of the ultrasonic transducer 5 may be classified as a spatial resolution in an axial direction (Z), a spatial resolution in a lateral direction (X), and a spatial resolution in an elevation direction (Y). A two-dimensional ultrasonic image is a cross-sectional image of the object. Therefore, the spatial resolution in the lateral direction (X) and the spatial resolution in the elevation direction (Y) of the ultrasonic transducer 5 affect an image quality of the two-dimensional ultrasonic image. The spatial resolution in the lateral direction (X) may be controlled by controlling a driving voltage in scanning in the lateral direction (X). However, it is difficult to control the spatial resolution in the elevation direction (Y) only by controlling the driving voltage, because it is not easy to independently arrange a signal line for each of the ultrasonic cells 20 to independently control the ultrasonic cells 20 in the elevation direction (Y). When a width of the ultrasonic beam in the elevation direction (Y) is highly thick, an artifact may occur, that is, information of an undesired location is included in the diagnostic image, thereby degrading reliability of the diagnosis. Therefore, a beam forming technology for reducing the width of the ultrasonic beam in the elevation direction (Y) in a focal region is needed. Also, in a case of the ultrasonic beam formed in the elevation direction (Y), when a large side lobe exists around a main beam, an artifact caused by the side lobe may be shown in the diagnostic image. Therefore, a beam forming technology capable of reducing influence of the side lobe is needed.

When a magnitude of the driving voltage is constant, a sound pressure of the ultrasonic beam varies depending on a height H of the cavity 27. The higher the height H of the cavity 27 is, the lower the sound pressure of the ultrasonic beam is. Considering this, the heights H of the cavities 27 in the plurality of ultrasonic cells 20 arranged in the elevation direction (Y) are determined by a function with respect to the elevation direction (Y) for improving the spatial resolution in the elevation direction (Y), according to an embodiment.

Figure 5:
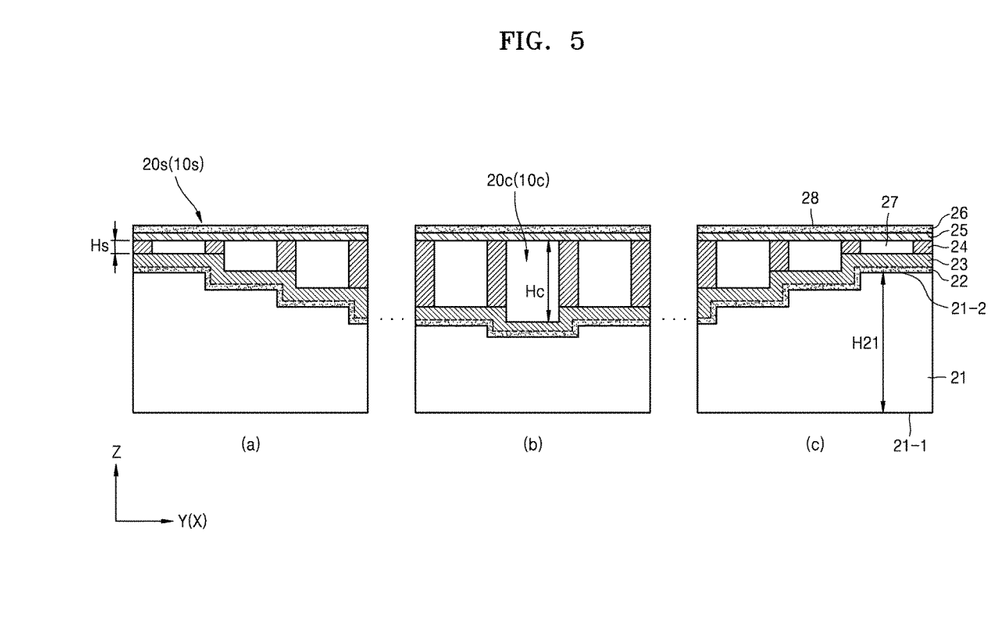
FIG. 5 is a cross-sectional view of an ultrasonic transducer having an overall concave shape according to an embodiment, taken along line A-A' of FIG. 3.

FIG. 5 is a cross-sectional view of the ultrasonic diagnostic apparatus taken along a line A-A' of FIG. 3. Referring to FIG. 5, a plurality of ultrasonic cells 20 are arranged in the elevation direction (Y). The upper electrodes 26 of the plurality of ultrasonic cells 20 are located at substantially the same height. A height Hc of the cavity 27 in the ultrasonic cell 20c that is located at a center in the elevation direction (Y), as shown in FIG. 5(b), is greater than heights Hs of the cavities in the ultrasonic cells 20s located at opposite ends in the elevation direction (Y), as shown in FIGS. 5(a) and 5(c). That is, the height H of the cavity 27 is reduced from the center toward the opposite ends in the elevation direction (Y). To obtain the above height distribution of the cavities 27, a plurality of stepped portions 21-2 having heights H21 that are increased gradually from the center portion toward the opposite ends in the elevation direction (Y) are disposed on an upper surface of the substrate 21. That is, the plurality of stepped portions 21-2 are stepped on the upper surface 21 to correspond to the heights H of the cavities 27, and thus, an overall concave shape is formed in the axial direction (Z). The ultrasonic cells 20 are respectively on the plurality of stepped portions 21-2. As such, the ultrasonic transducer 5 having a concave shape in the elevation direction (Y) may be formed. According to the present embodiment, a distance between the upper electrode 26 and the lower electrode 22 (or a distance between the upper electrode 26 and the stepped portion 21-2 in a case where the substrate 21 acts as the lower electrode 22) may be determined by a function with respect to the elevation direction (Y).

Figure 6:
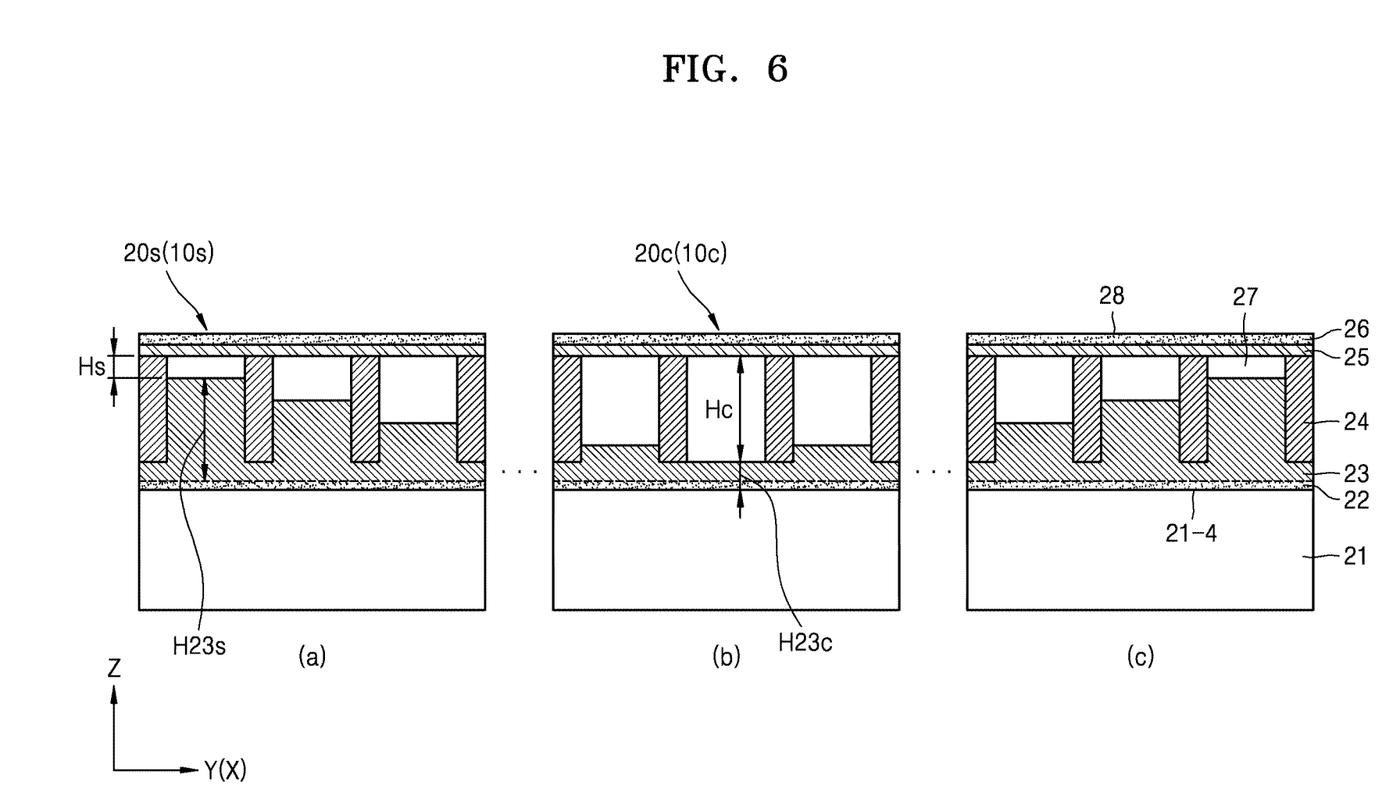
FIG. 6 is a cross-sectional view of an ultrasonic transducer having an overall concave shape according to another embodiment, taken along line A-A' of FIG. 3.

FIG. 6 is a cross-sectional view of the ultrasonic transducer 5 taken along line A-A' of FIG. 3 according to another embodiment, wherein the ultrasonic transducer 5 has an overall concave shape. Referring to FIG. 6, the substrate 21 has a constant thickness. That is, an upper surface 21-4 of the substrate 21 is a flat surface. The height H of the cavity 27 is determined by a thickness of the insulating layer 23. Therefore, a thickness of the insulating layer 23 in each of the ultrasonic cells 20 formed on the substrate 21 may vary depending on a location of the ultrasonic cell 20 in the elevation direction (Y). A thickness H23c of the insulating layer 23 in the ultrasonic cell 20c located at the center in the elevation direction (Y), as shown in FIG. 6(b), is less than thicknesses H23s of the insulating layers 23 in the ultrasonic cells 20s located at opposite ends in the elevation direction (Y), as shown in FIGS. 6(a) and 6(c). The thickness of the insulating layer 23 is gradually increased from the center toward the opposite ends in the elevation direction (Y). As such, since the upper electrodes 26 of the ultrasonic cells 20 are located at the constant level, the heights H of the cavities 27 are gradually reduced from the center toward the opposite ends in the elevation direction (Y), thereby forming the ultrasonic transducer 5 having an overall concave shape.

According to the present embodiment, a distance between the upper electrode 26 and the lower electrode 22 (or a distance between the upper electrode 26 and the upper surface 21-4 of the substrate 21 in a case where the substrate 21 acts as the lower electrode 22) may be constant.

Figure 7:
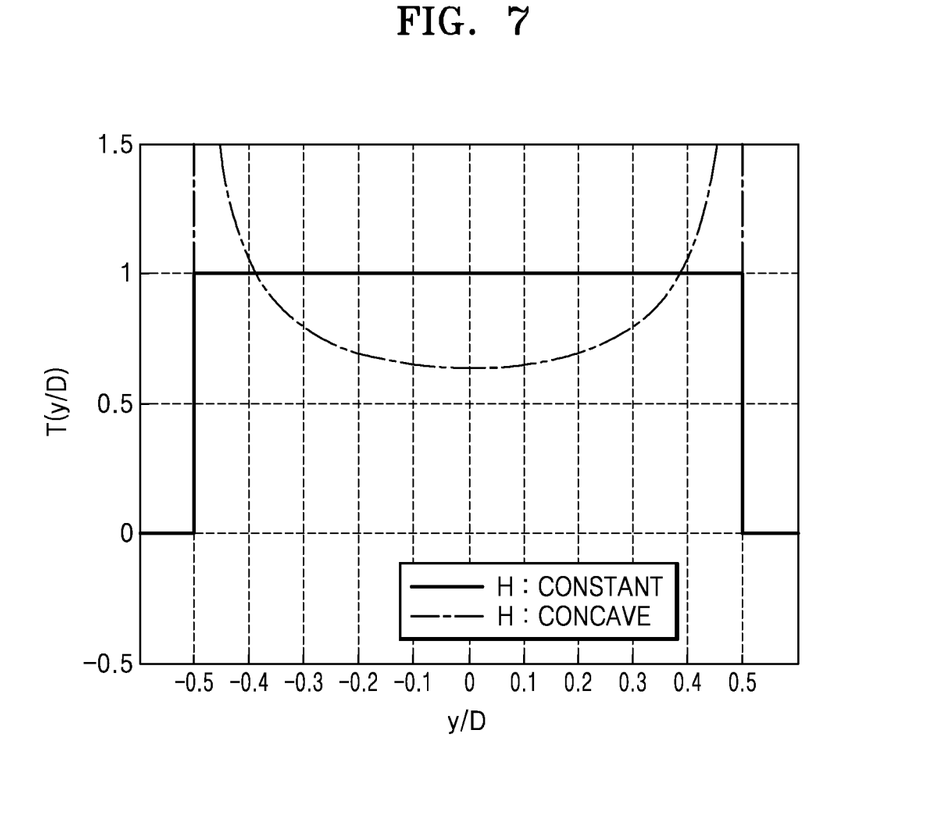
FIG. 7 is a graph showing an example of a distribution of heights of cavities in an elevation direction, in an ultrasonic transducer having an overall concave shape.
Figure 8:
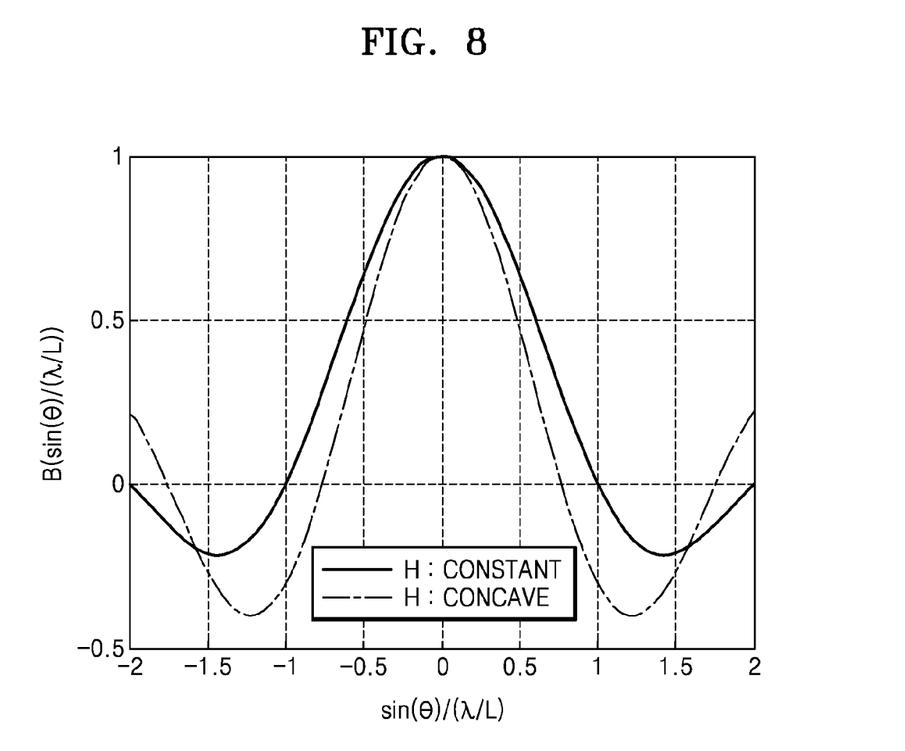
FIG. 8 is a graph showing examples of ultrasonic beam patterns in a case where an ultrasonic transducer has an overall concave shape as shown in FIG. 7, and in a case where and a height of a cavity is constant.

FIG. 7 is a graph showing an example of a distribution of the heights H of the cavities 27 in the elevation direction (Y), in the ultrasonic transducer 5 having an overall concave shape, that is, heights H of the cavities 27 are reduced gradually from a center toward opposite ends in the elevation direction (Y). In FIG. 7, a solid line denotes a case where the heights H of the cavities 27 are constant. In a transverse axis, y/D denotes a value that is obtained by non-dimensionalizing coordinates y of the ultrasonic cells 20 arranged in the elevation direction (Y) by using a length D (see FIG. 2) of the ultrasonic transducer 5 in the elevation direction (Y). In a longitudinal axis, T(y/D) is a value that is obtained by non-dimensionalizing the height H of the cavity 27 in the ultrasonic transducer 5 as a function of y/D by using the height value in a case where the height H of the cavity 27 is constant. FIG. 8 is a graph showing ultrasonic beam patterns in a case where the ultrasonic transducer 5 has an overall concave shape, that is, the heights H of the cavities 27 are gradually reduced from the center toward opposite ends in the elevation direction (Y) as shown in FIG. 7, and in a case where the height H of the cavity 27 is constant. In the transverse axis, B(sin(θ)/(λ/D)) denotes a beam pattern, wherein θ denotes a radiation angle, λ denotes a wavelength, and D is a length of the ultrasonic transducer 5 in the elevation direction (Y).

Referring to FIGS. 7 and 8, the ultrasonic beam pattern having a beam width that is less than that in a case where the height H of the cavity 27 is constant may be obtained by using the ultrasonic transducer 5 having the overall concave shape. That is, the ultrasonic beam pattern that is focused in the elevation direction (Y) may be obtained while applying a bias voltage and a pulse voltage of substantially the same magnitude to the ultrasonic cells 20 arranged in the elevation direction (Y).

In general, a time delay circuit for driving the ultrasonic cells 20 that are arranged in the elevation direction (Y) is needed according to an electronic focusing method; however, the ultrasonic beam pattern focused in the elevation direction (Y) may be obtained without using the time delay circuit according to an embodiment. In addition, the spatial resolution in the elevation direction (Y) may be improved. Also, the ultrasonic transducer may have a concave surface according to a mechanical focusing method that manufactures or arranges the ultrasonic transducer to be concave; however, according to the ultrasonic transducer 5 of the present embodiment, only the heights H of the cavities 27 are changed, and an upper surface 28 of the ultrasonic transducer 5 in the axial direction (Z) is flat. Thus, contact property between the ultrasonic transducer 5 and the object may be improved and stabilized diagnostic images may be obtained.

Figure 9:
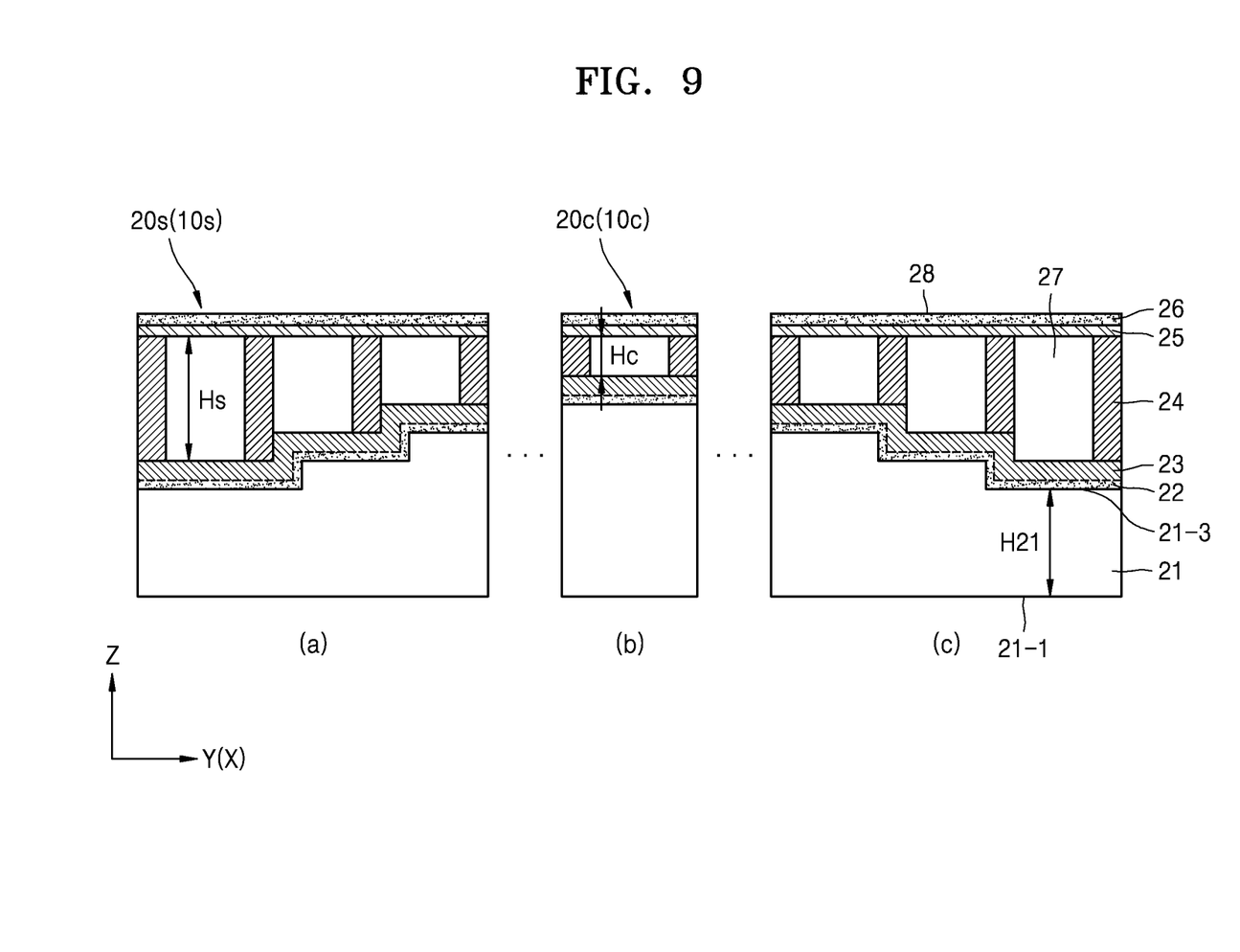
FIG. 9 is a cross-sectional view of an ultrasonic transducer having an overall convex shape taken along line A-A' of FIG. 3.

FIG. 9 is a cross-sectional view of the ultrasonic transducer 5 taken along line A-A' of FIG. 3. Referring to FIG. 9, the plurality of ultrasonic cells 20 are arranged in the elevation direction (Y). The upper electrodes 26 in the plurality of ultrasonic cells 20 are located at substantially the same height. A thickness Hc of the cavity 27 in the ultrasonic cell 20c located at a center in the elevation direction (Y), as shown in FIG. 9(b), is less than the heights Hs of the cavities 27 in the ultrasonic cells 20s located at opposite ends in the elevation direction (Y), as shown in FIGS. 9(a) and 9(c). That is, the height H of the cavity 27 is gradually increased from the center toward the opposite ends in the elevation direction (Y). To this end, a plurality of stepped portions 21-3 having heights H21 are disposed on the substrate 21, wherein the heights H21 from a lower surface 21-1 of the substrate 21 are gradually increased from the center toward the opposite ends in the elevation direction (Y). That is, the plurality of stepped portions 21-3 are formed on the upper surface of the substrate 21 to correspond to the heights H of the cavities 27 to form a convex portion in the axial direction (Z). The ultrasonic cells 20 are respectively formed on the plurality of stepped portions 21-3. As such, the ultrasonic transducer 5 may be formed to be overall convex in the elevation direction (Y).

Figure 10:
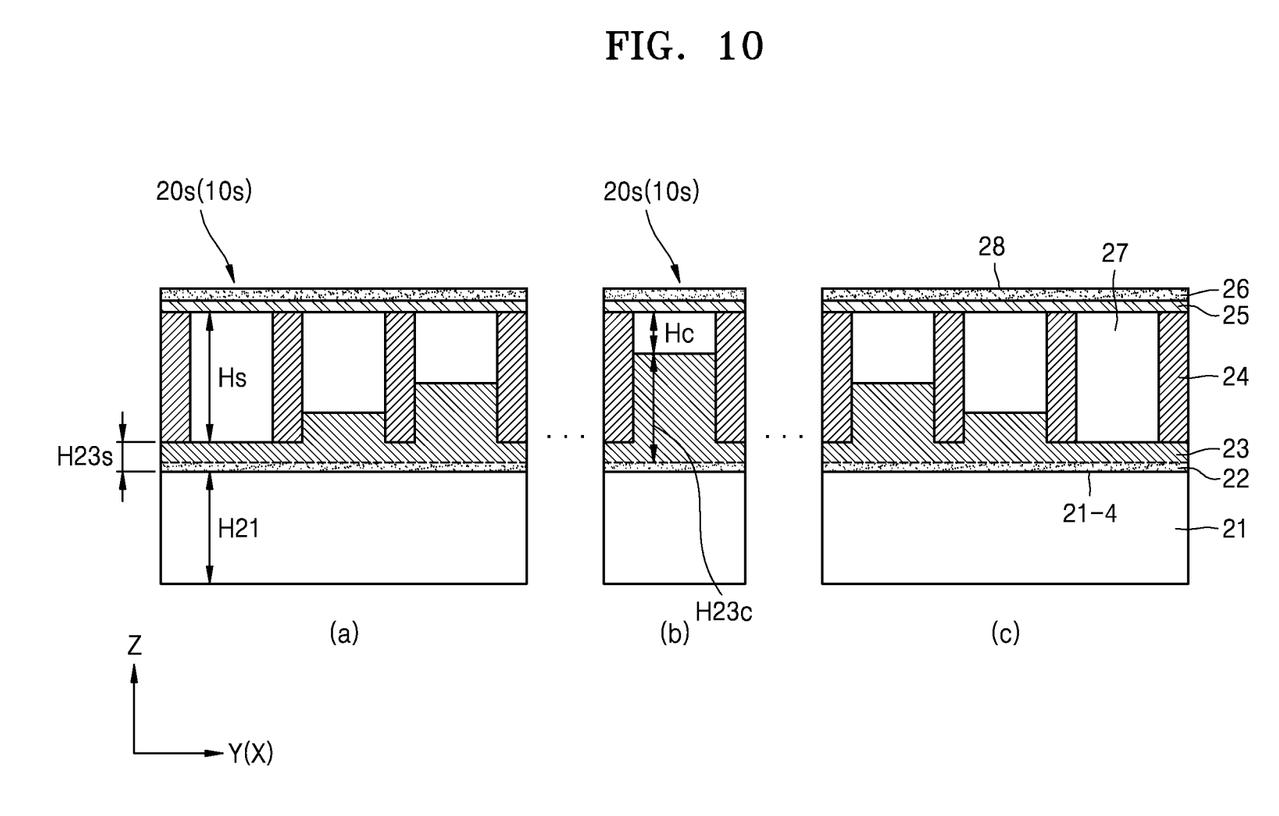
FIG. 10 is a cross-sectional view of an ultrasonic transducer having an overall convex shape taken along line A-A' of FIG. 3, according to another embodiment.

FIG. 10 is a cross-sectional view of the ultrasonic transducer 5 taken along line A-A' of FIG. 3 and having an overall convex shape in the elevation direction (Y) according to another embodiment. Referring to FIG. 10, the substrate 21 has a constant thickness, that is, an upper surface 21-4 of the substrate 21 is a flat surface. The heights H of the cavities 27 are determined by the thickness of the insulating layer 23. Therefore, the thickness of the insulating layer 23 in each of the ultrasonic cells 20 formed on the substrate 21 may vary depending on the location of the ultrasonic cell 20 in the elevation direction (Y). A thickness H23c of the insulating layer 23 in the ultrasonic cell 20c located at the center in the elevation direction (Y), as shown in FIG. 10(b), is greater than thicknesses H23s of the insulating layers 23 in the ultrasonic cells 20s located at opposite ends in the elevation direction (Y), as shown in FIGS. 10(a) and 10(c). The thickness of the insulating layer 23 is gradually reduced from the center toward the opposite ends in the elevation direction (Y). As such, since the upper electrodes 26 of the ultrasonic cells 20 have a constant height, the ultrasonic transducer 5 having an overall convex shape, in which the heights H of the cavities 27 are gradually increased from the center toward the opposite ends in the elevation direction (Y), may be realized.

Figure 11:
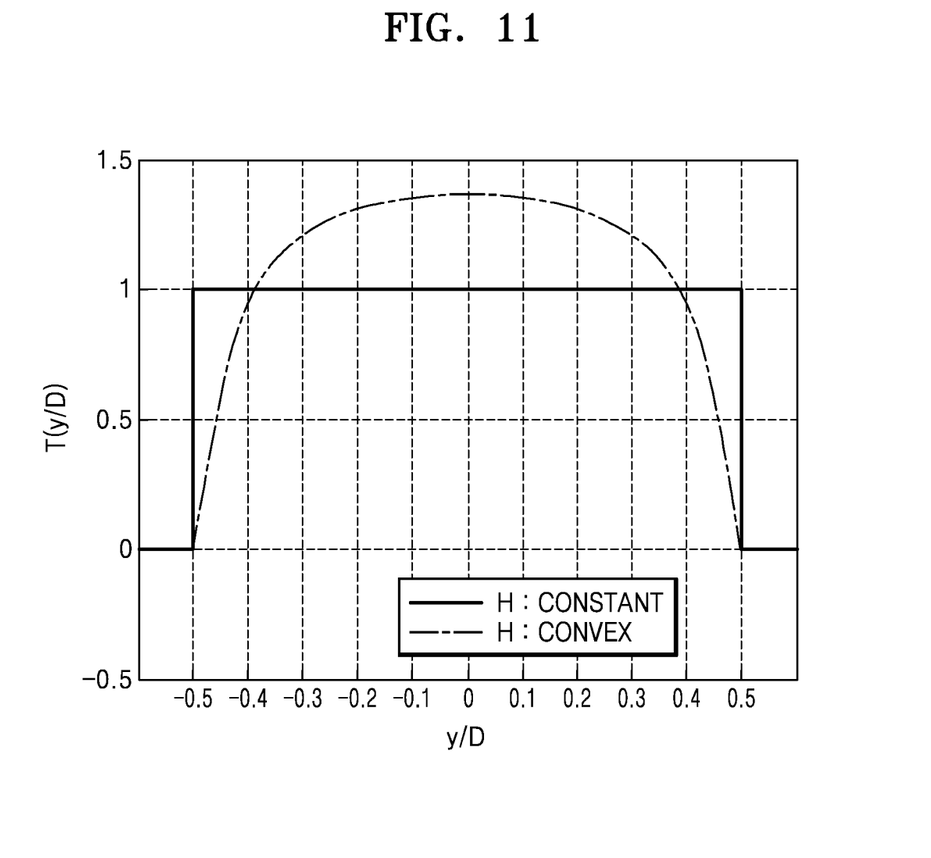
FIG. 11 is a graph showing an example of a distribution of heights of cavities in an elevation direction, in an ultrasonic transducer having an overall convex shape.
Figure 12:
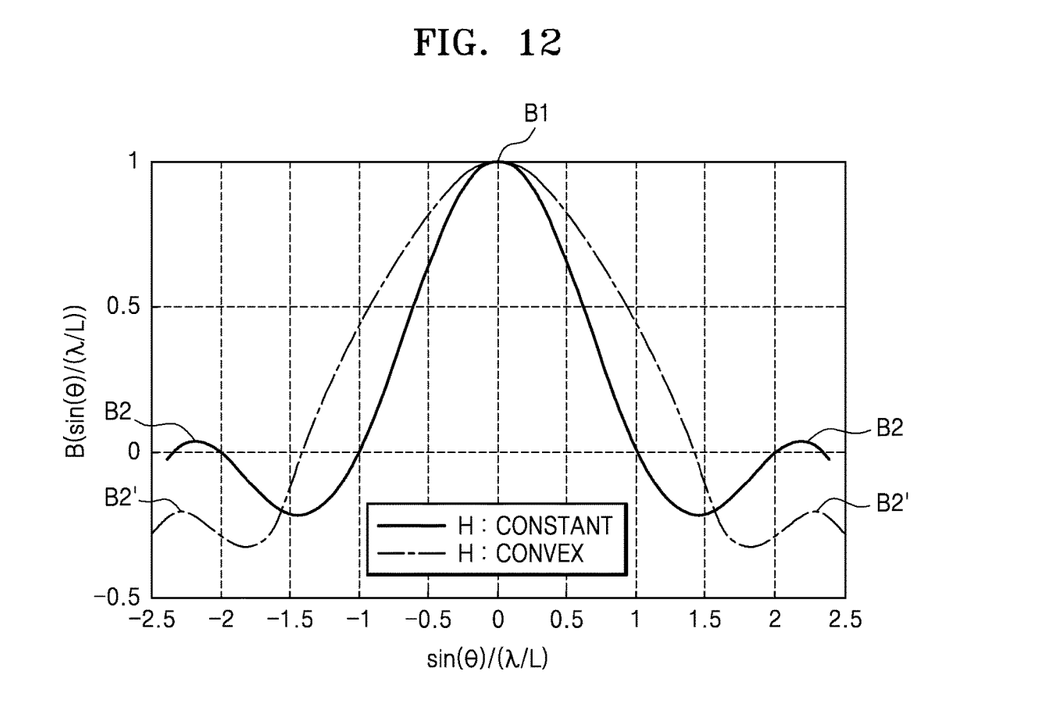
FIG. 12 is a graph showing ultrasonic beam patterns in a case where an ultrasonic transducer has an overall convex shape as shown in FIG. 11, and in a case where a height of a cavity is constant.

FIG. 11 is a graph showing an example of a distribution of the heights H of the cavities 27 in the elevation direction (Y), in the ultrasonic transducer 5 having an overall convex shape, that is, heights H of the cavities 27 are increased gradually from a center toward opposite ends in the elevation direction (Y). In FIG. 11, a solid line denotes a case where the heights H of the cavities 27 are constant. In a transverse axis, y/D denotes a value that is obtained by non-dimensionalizing coordinates y of the ultrasonic cells 20 arranged in the elevation direction (Y) by using a length D (see FIG. 2) of the ultrasonic transducer 5 that has an overall convex shape in the elevation direction (Y). In a longitudinal axis, T(y/D) is a value that is obtained by non-dimensionalizing the height H of the cavity 27 in the ultrasonic transducer 5 as a function of y/D by using the height value in a case where the height H of the cavity 27 is constant. FIG. 12 is a graph showing ultrasonic beam patterns in a case where the ultrasonic transducer 5 having an overall convex shape, that is, the heights H of the cavities 27 are gradually increased from the center toward opposite ends in the elevation direction (Y) as shown in FIG. 11, and in a case where the height H of the cavity 27 is constant. In the transverse axis, B(sin(θ)/(λ/D)) denotes a beam pattern, wherein θ denotes a radiation angle, λ denotes a wavelength, and D is a length of the ultrasonic transducer 5 in the elevation direction (Y).

Referring to FIG. 12, in a case where the heights H of the cavities 27 are constant, two side lobes B2 are shown on outer portions of a main lobe B1, as denoted by a solid line. When outputs of the side lobes B2 are higher, an artifact may occur, that is, undesired information may be included in the ultrasonic image. However, according to the ultrasonic transducer 5 having the overall convex shape of the present embodiment, outputs of side lobes B2' may be lower than those when the heights H of the cavities 27 are constant, as denoted by a dashed dot line. Thus, according to the ultrasonic transducer 5 having the overall convex shape, the output of the side lobes B2 may be reduced and a possibility of generating the artifact may be reduced.

Also, according to the ultrasonic transducer 5 of the present embodiment, the possibility of generating the artifact due to the side lobes may be reduced without changing the configuration of the driving circuit. In addition, since only the heights H of the cavities 27 are changed and the upper surface 28 of the ultrasonic transducer 5 in the axial direction (Z) is flat, the contact property between the ultrasonic transducer 5 and the object may be improved and the stabilized diagnostic images may be obtained.

The distribution of the heights H of the cavities is not limited to the examples shown in FIGS. 7 and 11, and may be determined for obtaining a desired ultrasonic beam pattern.

In the above exemplary embodiments, the heights of the cavities 27 in the plurality of ultrasonic cells 20 in the axial direction (Z) are determined by a function of the location in the elevation direction (Y). However, in an alternative embodiment, to improve the spatial resolution in the lateral direction (X) by using the plurality of ultrasonic cells 20, heights of the cavities 27 in the plurality of ultrasonic cells 20 in the axial direction (Z) may be determined by a function of the location in the lateral direction (X). In this case, a cross-section of the ultrasonic transducer 5 taken along line B-B' of FIG. 3 may be shown as those of FIGS. 5, 6, 9, and 10, and the corresponding description of FIGS. 5, 6, 9, and 10 may apply while replacing the elevation direction (Y) with the lateral direction (X). In addition, in the above exemplary embodiments, the plurality of ultrasonic cells 20 are arranged two dimensionally in the elevation direction (Y) and the lateral direction (X); however, in a case where the plurality of ultrasonic cells 20 are arranged one-dimensionally in the elevation direction (Y) or the lateral direction (X), the heights of the cavities 27 in the plurality of ultrasonic cells 20 in the axial direction (Z) may be determined by a function of the location in the elevation direction (Y) or in the lateral direction (X). That is, the heights of the cavities 27 in the plurality of ultrasonic cells 20 in the axial direction (Z) may be determined by a function in a direction in which the plurality of ultrasonic cells 20 are arranged.

Figure 13:
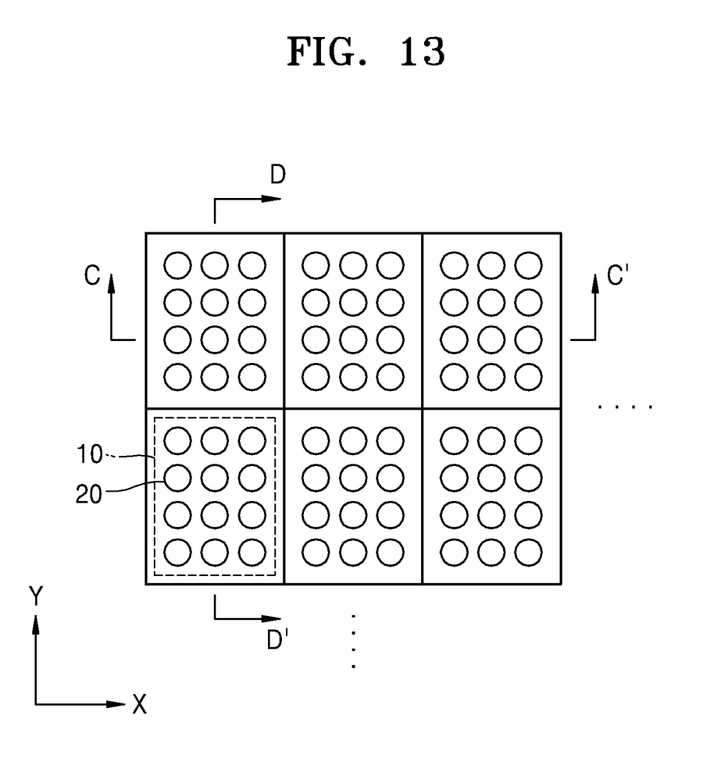
FIG. 13 is a plan view of an ultrasonic transducer according to an embodiment.

The plurality of ultrasonic cells 20 may be classified as a plurality of ultrasonic elements 10. The plurality of ultrasonic elements 10 may be arranged one-dimensionally in the lateral direction (X) as shown in FIG. 3, or may be arranged two-dimensionally in the lateral direction (X) and the elevation direction (Y) as shown in FIG. 13. In this case, the height of the cavity 27 in the ultrasonic cell 20 in the axial direction (Z) may be determined by a function of a location in a direction in which the ultrasonic elements 10 are arranged. The heights in the axial direction (Z) of the cavities 27 of the plurality of ultrasonic cell 20 in each of the ultrasonic elements 10 are substantially the same as each other. In the present embodiment, a cross-section of the ultrasonic transducer 5 taken along line B-B' of FIG. 3 and line C-C' of FIG. 13 may be formed as those of FIGS. 5, 6, 9, and 10, and the corresponding description of FIGS. 5, 6, 9, and 10 may apply. Here, 'the ultrasonic cell 20c located at the center' and 'the ultrasonic cells 20s located at opposite ends' may correspond to 'an ultrasonic element 10c located at a center' and 'ultrasonic elements 10s located at opposite ends'. Also, the cross-section taken along line D-D' of FIG. 13 may correspond to those of FIGS. 5, 6, 9, and 10, and the corresponding description may apply. Here, 'the elevation direction (Y)' in FIGS. 5, 6, 9, and 10 may correspond to 'the lateral direction (X)' in FIG. 13 and 'the ultrasonic cell 20c located at the center' and 'the ultrasonic cells 20s located at opposite ends' may correspond to 'an ultrasonic element 10c located at a center' and 'ultrasonic elements 10s located at opposite ends'.

Although a few exemplary embodiments have been shown and described, it would be appreciated by those skilled in the art that changes may be made in these embodiments without departing from the principles and spirit of the disclosure, the scope of which is defined in the claims and their equivalents.

What is claimed is:

1. An ultrasonic transducer comprising:
   a substrate; and
   a plurality of capacitive ultrasonic cells arranged on an upper surface of the substrate in a predetermined direction,
   wherein thicknesses of cavities in the plurality of capacitive ultrasonic cells vary based on locations of the plurality of capacitive ultrasonic cells in the predetermined direction, and an upper surface of each of the plurality of capacitive ultrasonic cells corresponds to a flat surface,
   wherein each of the cavities in the plurality of capacitive ultrasonic cells has a lower surface and an uppers surface, the lower surface of each of the cavities being closer to the upper surface of the substrate in the predetermined direction than the upper surface of each of the cavities, and
   wherein lower surfaces of the cavities in the plurality of capacitive ultrasonic cells are at different levels from a lower surface of the substrate.

2. The ultrasonic transducer of claim 1, wherein the plurality of capacitive ultrasonic cells are arranged two dimensionally in a first direction and a second direction, and the thicknesses of the cavities in the plurality of capacitive ultrasonic cells are determined based on locations of the plurality of capacitive ultrasonic cells in at least one from among the first direction and the second direction.

3. The ultrasonic transducer of claim 2, wherein a thickness of a cavity in a capacitive ultrasonic cell is greater at a center portion of the ultrasonic transducer than at an end portion thereof in at least one from among the first direction and the second direction.

4. The ultrasonic transducer of claim 2, wherein a thicknesses of a cavity in a capacitive ultrasonic cell is smaller at a center portion of the ultrasonic transducer than at an end portion thereof in at least one from among the first direction and the second direction.

5. The ultrasonic transducer of claim 1, wherein each of the plurality of capacitive ultrasonic cells comprises a lower electrode provided on the substrate, an insulating layer provided on the lower electrode, a barrier wall provided on the insulating layer, a vibration layer provided on the barrier wall, and an upper electrode provided on the vibration layer, wherein thicknesses of the upper electrodes in the plurality of capacitive ultrasonic cells are substantially the same.

6. The ultrasonic transducer of claim 5, wherein the substrate provides lower electrodes of the plurality of capacitive ultrasonic cells.

7. The ultrasonic transducer of claim 5, wherein thicknesses of the insulating layers in the plurality of capacitive ultrasonic cells are substantially constant.

8. The ultrasonic transducer of claim 7, wherein a plurality of stepped portions corresponding to the thicknesses of the cavities in the plurality of capacitive ultrasonic cells are provided on the upper surface of the substrate, and the plurality of capacitive ultrasonic cells are provided respectively on the plurality of stepped portions.

9. The ultrasonic transducer of claim 5, wherein distances between the upper electrodes and the lower electrodes in the plurality of capacitive ultrasonic cells are substantially constant.

10. The ultrasonic transducer of claim 9, wherein a thickness of the insulating layer in the each of the plurality of capacitive ultrasonic cells varies depending on a location of a corresponding capacitive ultrasonic cell in the first direction.

11. The ultrasonic transducer of claim 1, further comprising:
a plurality of elements arranged on the substrate in a first direction, each of the plurality of elements comprising the plurality of capacitive ultrasonic cells arranged in a second direction, each capacitive ultrasonic cell comprising a lower electrode and an upper electrode,
wherein thicknesses of upper electrodes in the plurality of capacitive ultrasonic cells are substantially the same, and distances between the upper electrodes and lower electrodes in the plurality of capacitive ultrasonic cells are determined based on locations of the plurality of capacitive ultrasonic cells in the first direction.

12. The ultrasonic transducer of claim 11, wherein the substrate provides the lower electrodes of the plurality of capacitive ultrasonic cells.

13. The ultrasonic transducer of claim 11, wherein a plurality of stepped portions corresponding to the distances between the upper electrodes and the lower electrodes in the plurality of capacitive ultrasonic cells are provided on the upper surface of the substrate and are arranged in the first direction.

14. The ultrasonic transducer of claim 11, wherein a distance between an upper electrode and a lower electrode in a capacitive ultrasonic cell is greater at a center portion of the ultrasonic transducer than at an end portion thereof in the first direction.

15. The ultrasonic transducer of claim 11, wherein a distance between an upper electrode and a lower electrode in a capacitive ultrasonic cell is smaller at a center portion of the ultrasonic transducer than at an end portion thereof in the first direction.

16. An ultrasonic diagnostic apparatus comprising:
an ultrasonic probe comprising the ultrasonic transducer of claim 1, configured to transmit an ultrasonic wave to an object, and configured to receive an ultrasonic wave reflected from the object to generate an echo signal; and
a signal processing device configured to generate an image of the object based on the echo signal.

17. The ultrasonic diagnostic apparatus of claim 16, wherein the plurality of capacitive ultrasonic cells are arranged two dimensionally in a first direction and a second direction, and thicknesses of cavities in the plurality of capacitive ultrasonic cells are determined based on locations of the plurality of capacitive ultrasonic cells in at least one from among the first direction and the second direction.

18. The ultrasonic diagnostic apparatus of claim 17, wherein each of the plurality of capacitive ultrasonic cells has a lower surface and an upper surface, the lower surface of each of the plurality of capacitive ultrasonic cells being closer to the upper surface of the substrate in the predetermined direction than the upper surface of each of the plurality of capacitive ultrasonic cells, and upper surfaces of the plurality of capacitive ultrasonic cells in an axial direction are flat surfaces.

19. The ultrasonic transducer of claim 1, wherein each of the plurality of capacitive ultrasonic cells has a lower surface and an upper surface, the lower surface of each of the plurality of capacitive ultrasonic cells being closer to the upper surface of the substrate in the predetermined direction than the upper surface of each of the plurality of capacitive ultrasonic cells, and upper surfaces of the plurality of capacitive ultrasonic cells are at the same level from the lower surface of the substrate.

20. The ultrasonic diagnostic apparatus of claim 16, wherein each of the plurality of capacitive ultrasonic cells has a lower surface and an upper surface, the lower surface of each of the plurality of capacitive ultrasonic cells being closer to the upper surface of the substrate in the predetermined direction than the upper surface of each of the plurality of capacitive ultrasonic cells, and upper surfaces of the plurality of capacitive ultrasonic cells are at the same level from the lower surface of the substrate.

* * * * *